United States Patent [19]
Takayama

[11] Patent Number: 5,943,468
[45] Date of Patent: *Aug. 24, 1999

[54] APPARATUS FOR REPRODUCING DATA FROM A MEMORY DEVICE INTEGRALLY PROVIDED WITH A PLURALITY OF KINDS OF RECORDING MEDIA

[75] Inventor: Nobutoshi Takayama, Yokohama, Japan

[73] Assignee: Canon Kabushiki Kaisha, Tokyo, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/764,948

[22] Filed: Dec. 13, 1996

[30] Foreign Application Priority Data

Jan. 5, 1996 [JP] Japan .................................... 8-000280

[51] Int. Cl.[6] .............................. H04N 5/91; H04N 5/911
[52] U.S. Cl. ............................................. 386/113; 386/94
[58] Field of Search .................................. 386/94, 95, 52, 386/46, 4, 113; 360/13, 15; 348/6, 7, 12, 13; 380/5; H04N 5/91, 5/911

[56] References Cited

U.S. PATENT DOCUMENTS 5,574,787 11/1996 Ryan ............................................ 380/5
5,664,046 9/1997 Abecassis ................................ 386/125

*Primary Examiner*—Robert Chevalier
*Attorney, Agent, or Firm*—Robin, Blecker & Daley

[57] ABSTRACT

In a reproducing apparatus for reproducing data from a memory device integrally provided with a first recording medium and a second recording medium of respective different kinds, a reproduction protect applied to image data of each of a plurality of programs recorded in the second recording medium is automatically cancelled according to data reproduced from the first recording medium.

27 Claims, 10 Drawing Sheets

FIG. 6

| UPPER<br>LOWER | 0h | 1h | 2h | ..... | Fh |
|---|---|---|---|---|---|
| 0h | | PROGRAM | PROGRAM KEY | | |
| 1h | | PROGRAM START | | | |
| 2h | | PROGRAM END | | | |
| ⋮ | | | | | |
| Fh | | | | | |

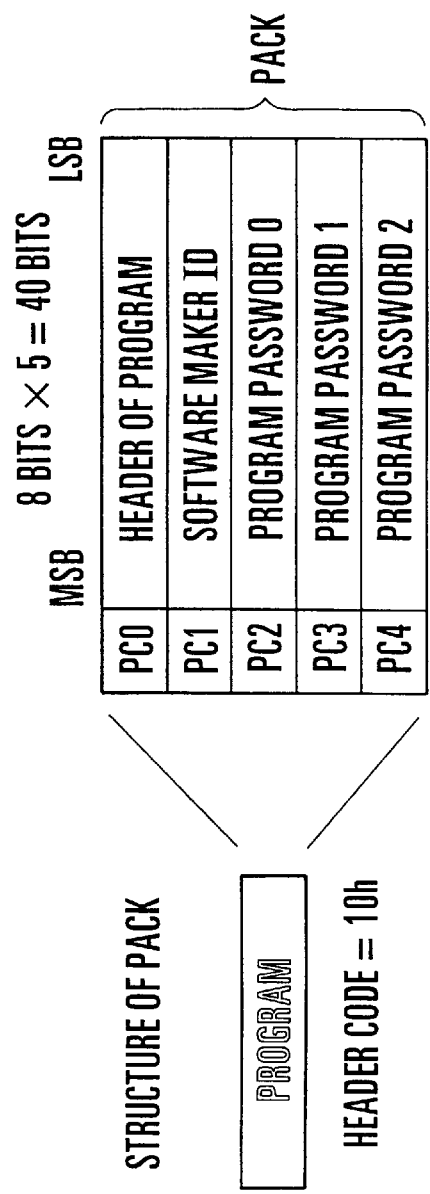
F I G. 7 (a)
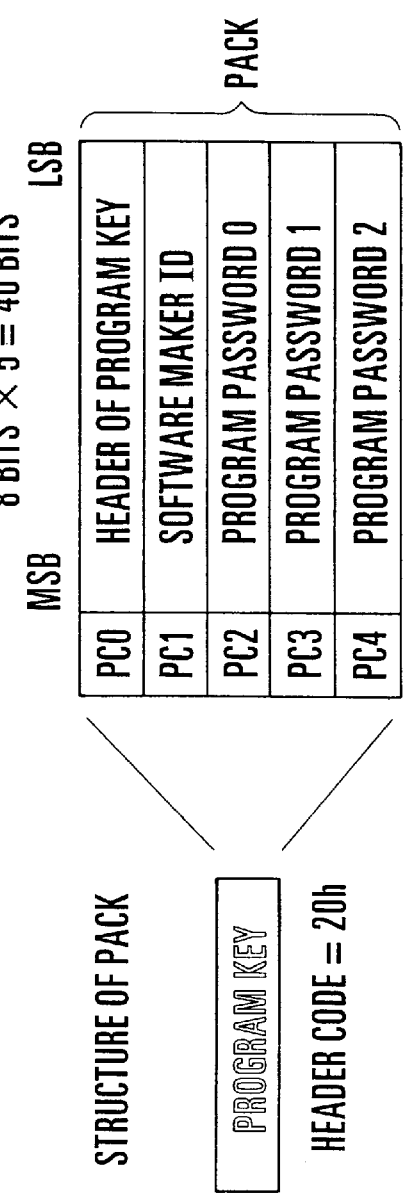
F I G. 7 (b)

APPARATUS FOR REPRODUCING DATA FROM A MEMORY DEVICE INTEGRALLY PROVIDED WITH A PLURALITY OF KINDS OF RECORDING MEDIA

BACKGROUND OF THE INVENTION

1. Field of the Invention

This invention relates to a reproducing apparatus and, more particularly, to an apparatus for reproducing data from a memory device integrally provided with a plurality of kinds of recording media.

2. Description of Related Art

Heretofore, there are well known video tape recorders (VTRs) each of which records and reproduces video data and audio data on and from a magnetic tape contained in a tape cassette. Meanwhile, tape cassettes each containing a magnetic tape having video and audio data recorded thereon, i.e., so-called software tapes, are being marketed for sale or for rent. Normally, each of the software tapes is determined at the time of production (at the time of recording) so as to have only a single utility value for reproduction. Thus, software tapes having respective different contents and ranges of reproducible information are individually produced.

In other words, each of the software tapes is arranged to allow the whole information recorded thereon to be reproduced on the side of the user.

At present, the software tapes are prepared in innumerable kinds, thus necessitating rental shops or the like to have an extremely wide space for display.

Further, there has been no available art for selecting and deciding the utility value or kind of a software tape at the shop or store according to the desire of the user, that is, for selectively limiting a portion reproducible by the user to only a part of the software tape.

Meanwhile, during recent years, streamers for computers or the like have been developed in which digital data are recorded on tapes. It is conceivable to provide rental software tapes usable for such streamers. In such an occasion, it would be possible to record a plurality of program files, etc., on a single tape beforehand and to decide, at the shop or store, a reproducible area of the tape according to the desire of the user. Such arrangement is highly advantageous for reduction in the kind and amount of the software tapes.

Further, such arrangement is desirous not only for the rental software tapes but also for software tapes on sale, in reducing their kinds which are too numerous.

BRIEF SUMMARY OF THE INVENTION

It is an object of this invention to solve the problems of the prior art described in the foregoing.

It is another object of this invention to provide an apparatus which is capable of selectively cancelling an unrestorable state of each of a plurality of programs recorded on a recording medium.

Under these objects, in accordance with one aspect of this invention, there is provided an apparatus for reproducing data from a memory device integrally provided with a first recording medium and a second recording medium of respective different kinds, comprising first reproducing means for reproducing data from the first recording medium, second reproducing means for reproducing image data from the second recording medium, restoring means for restoring an original image from the image data reproduced by the second reproducing means, and control means for, on the basis of the data reproduced by the first reproducing means, changing image data reproduced by the second reproducing means and being unrestorable by the restoring means into a restorable state.

The above and other objects and features of this invention will become apparent from the following detailed description of embodiments thereof taken in conjunction with the accompanying drawings.

BRIEF DESCRIPTION OF THE SEVERAL VIEWS OF THE DRAWING

FIG. 6 shows a construction of data stored in the memory of the tape cassette in the digital VTR shown in FIG. 1.

FIGS. 7($a$) and 7($b$) are diagrams for explaining data stored in the memory of the tape cassette in the digital VTR shown in FIG. 1.

DETAILED DESCRIPTION OF THE INVENTION

In the following, preferred embodiments of this invention will be described in detail with reference to the drawings.

The arrangement of the whole apparatus according to an embodiment of this invention and the construction of data to be used by the apparatus will first be described, and, after that, an operation of the apparatus performed by using the data will be described.

Figure 1:
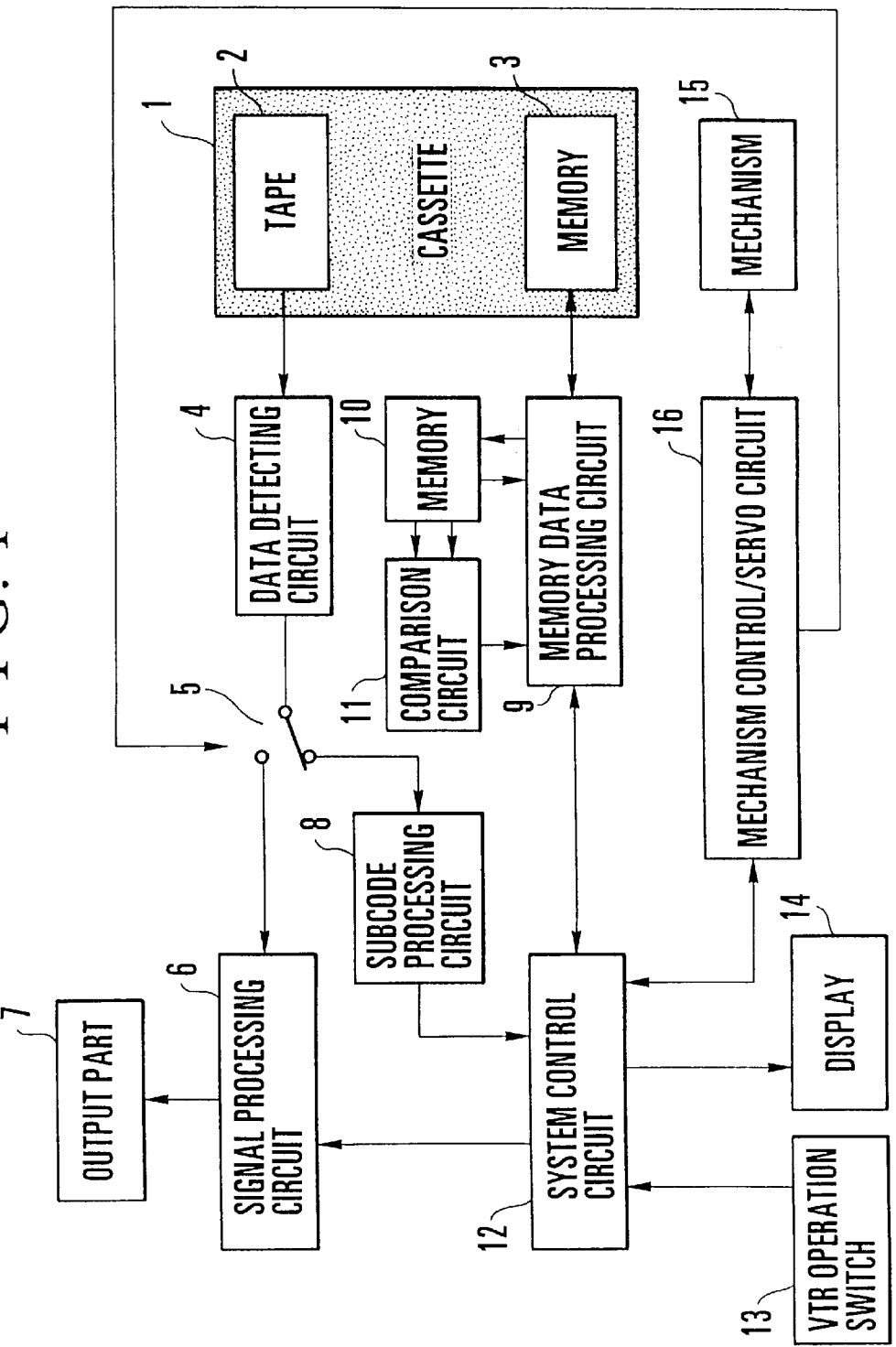
FIG. 1 is a block diagram showing the arrangement of a digital VTR according to an embodiment of this invention.

FIG. 1 is a block diagram showing the arrangement of a digital VTR according to a first embodiment of this invention. Referring to FIG. 1, there are illustrated a tape cassette 1, a tape 2, a semiconductor memory 3, a data detecting circuit 4 including a magnetic head arrangement and arranged to detect original digital data from data reproduced from the tape 1, a switch 5, a signal processing circuit 6 arranged to decode reproduced video and audio data and to expand the amount of information of the decoded data, an output part 7 arranged to output to the outside the video and audio data outputted from the signal processing circuit 6, a subcode processing circuit 8 arranged to process subcode data included in the reproduced data, a memory data processing circuit 9 arranged to write and read data into and from the memory 3, a memory 10 arranged to store data read out from the memory 3, a comparison circuit 11 arranged to perform a comparing action using the reproduced data obtained from the memory 3 in a manner as will be described later herein, a system control circuit 12 arranged to control actions of the whole digital VTR, an operation switch 13 arranged to permit giving instructions for actions of the VTR, a display 14 arranged to provide a predetermined display in accordance with an instruction from the system control circuit 12, a mechanism 15 arranged to cause the tape 2 to travel, and a mechanism control/servo circuit 16 arranged to control the mechanism 15.

Figure 2:
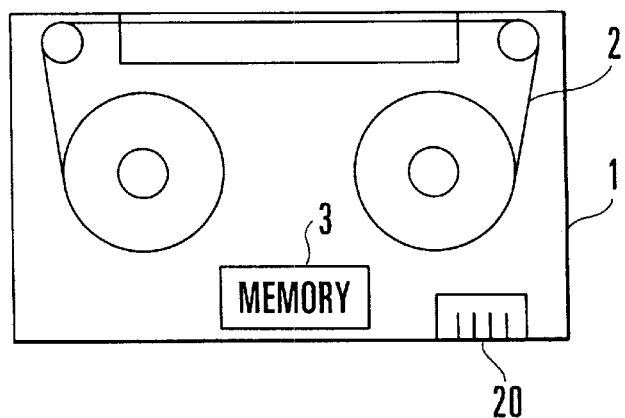
FIG. 2 shows the structure of a tape cassette for use in the digital VTR shown in FIG. 1.

FIG. 2 shows the structural arrangement of the tape cassette 1 to be used by the VTR shown in FIG. 1. In FIG. 2, reference numerals 1, 2 and 3 denote the same elements as those indicated in FIG. 1. The tape cassette 1 is provided with a terminal 20 for performing communication between the memory 3 and the memory data processing circuit 9 disposed within the body of the VTR.

Figure 3:
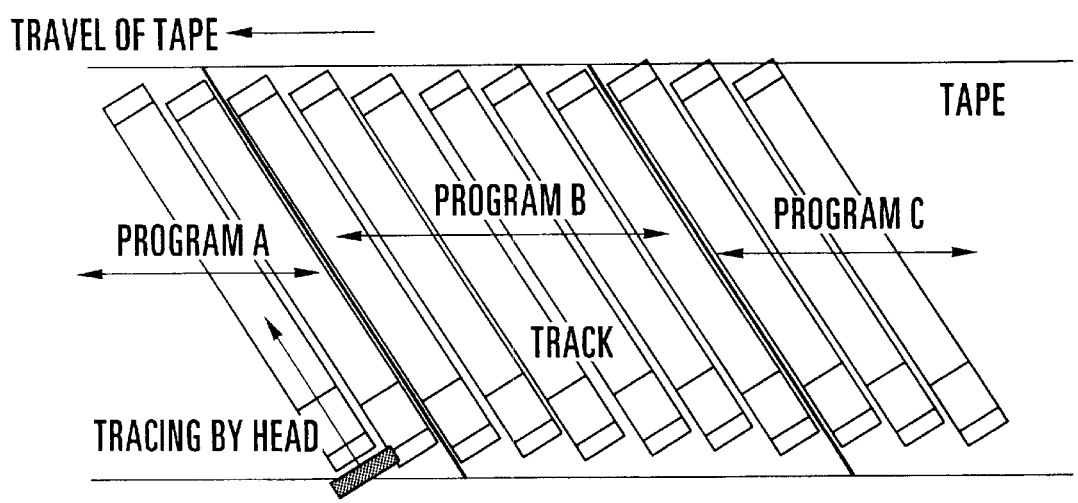
FIG. 3 shows the pattern of recording tracks which are recorded by the digital VTR shown in FIG. 1.

FIG. 3 shows the pattern of recording tracks which are formed on the tape 2 by the VTR shown in FIG. 1. In the case of the first embodiment, programs A, B and C are recorded in the recording tracks one after another.

Figure 4:
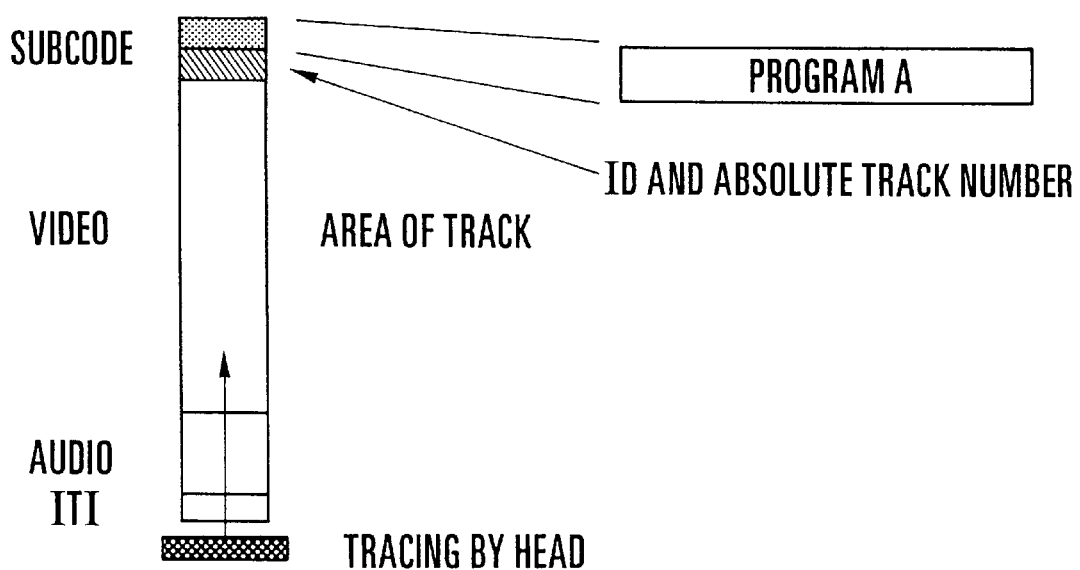
FIG. 4 shows the areas of each recording track shown in FIG. 3.

FIG. 4 shows recording areas provided in each of the recording tracks shown in FIG. 3.

Referring to FIG. 4, each of the recording tracks is divided into data areas, i.e., an ITI area, an audio area, a video area and a subcode area, in the order of tracing by the magnetic head of the VTR. In the ITI area, there are recorded data to be used for generating clock pulses in synchronism with reproduced data during a reproducing operation.

In the subcode area, there are recorded, in addition to ID data for searching such as an index or the like, track number data indicative of applicable one of serial track numbers assigned to all the tracks consecutively from a leader end of the tape. This track number data makes it possible to determine the position of the tape being currently reproduced within the cassette. Hereinafter, the track number data will be called ATN data (absolute track number data).

In the subcode area, there are further recorded program information, which is able to be correlated with data recorded within the memory 3 in units of video data or audio data. The details of the program information will be described later herein. In the case of this embodiment, a program for which the program information is recorded cannot be restored to its original information (video data and audio data) as long as it stands, and a password is required for cancelling the unrestorable state of the program.

Incidentally, the term "unrestorable state" as used herein for the embodiment of this invention means a state in which video data and audio data are inhibited from being decoded by the signal processing circuit 6. However, the unrestorable state may mean a state in which data is inhibited from being read out from a memory (not shown) provided for storing decoded data.

In the case of this embodiment, while the ID data and the ATN data are recorded in every one of the recording tracks, the above-mentioned program information is recorded periodically with respect to other information, i.e., in every predetermined number of tracks, for example, in every ten tracks. In the case of the track shown in FIG. 4, program information indicating that the contents of the record in the video area are data of the program A is recorded in the subcode area. This arrangement, however, may be changed to record the program information in every track in the same manner as the ID data and the ATN data.

Figure 5:
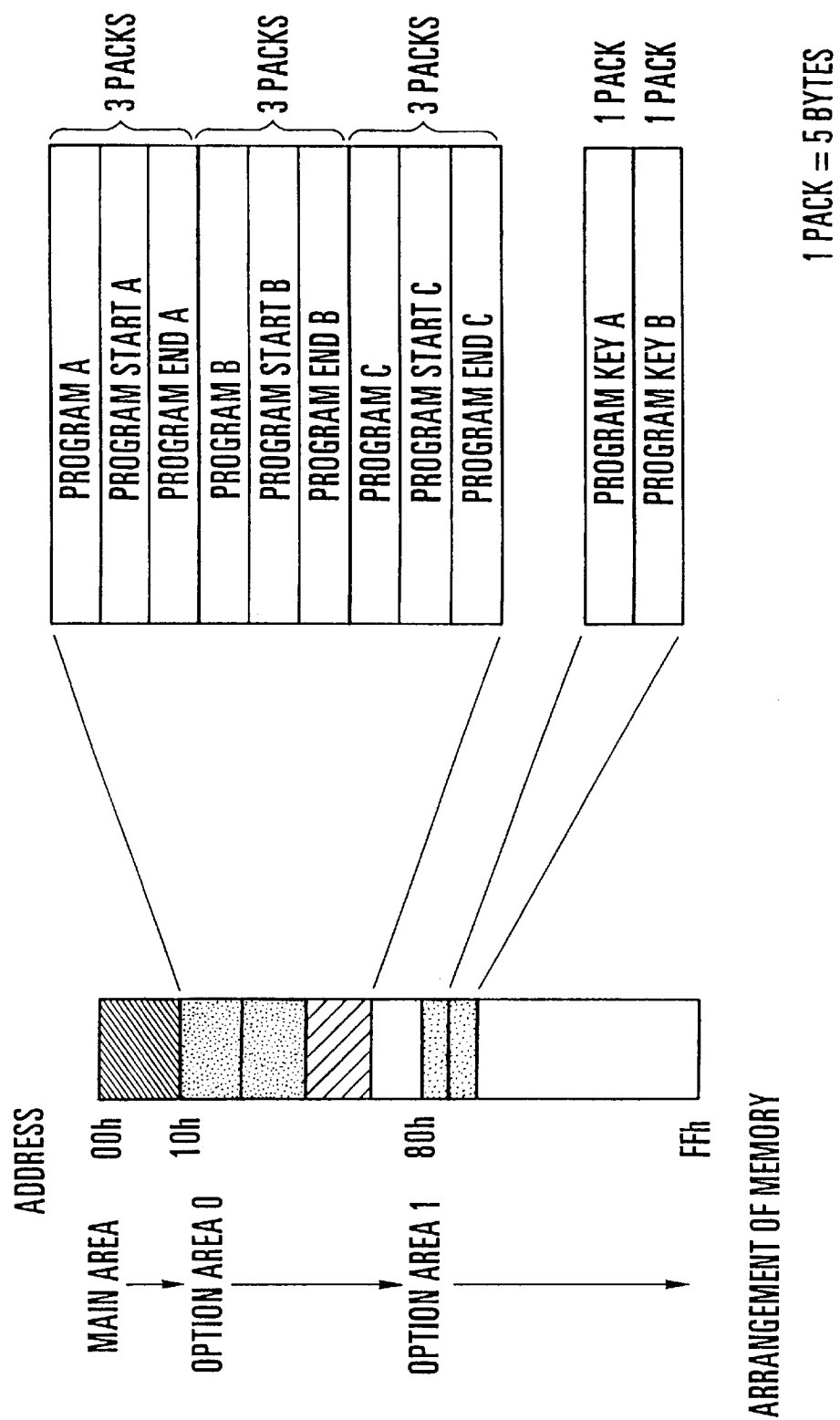
FIG. 5 is a diagram for explaining data stored in a memory of the tape cassette in the digital VTR shown in FIG. 1.
Figure 8:
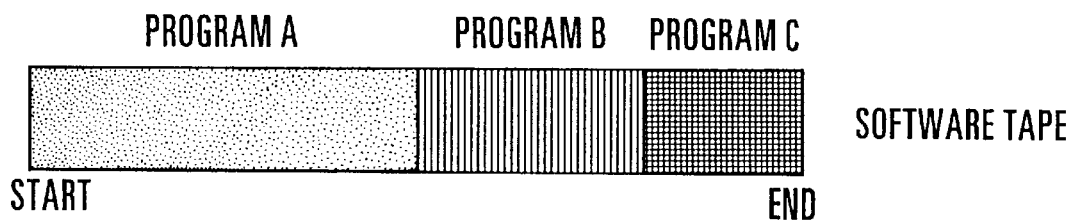
FIGS. 8($a$) to 8($d$) are diagrams for explaining an operation of the digital VTR shown in FIG. 1.
Figure 8:
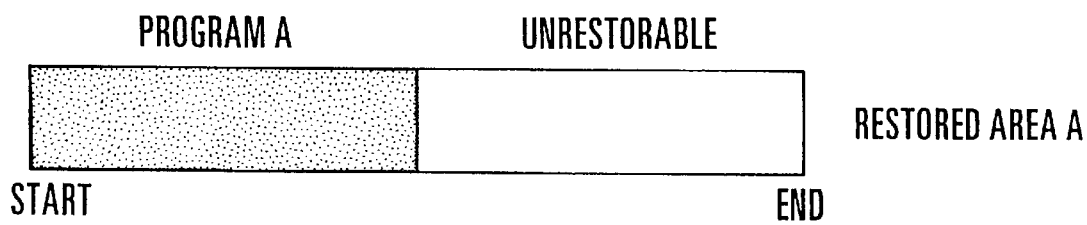
Figure 8:
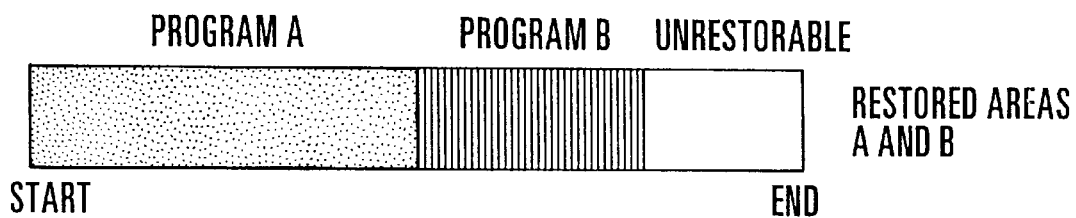
Figure 8:
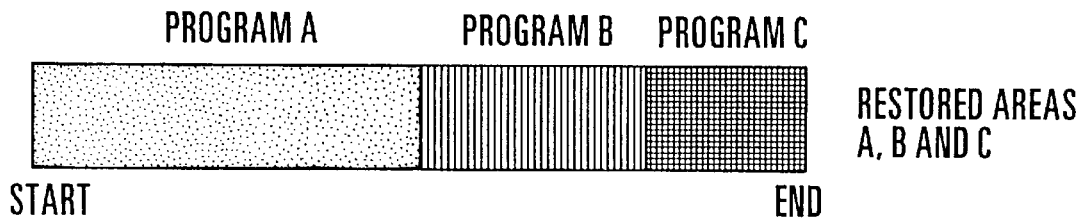

FIG. 5 shows an example of the arrangement of a memory space and an example of recorded data in the memory 3. Referring to FIG. 5, basic ID data of the cassette are recorded at addresses "00h" to "10h" serving as a main area. At addresses "10h" to "7Fh" serving as an option area 0, there are recorded program information, similar to the program information recorded on the tape, as data corresponding to the program information recorded in the subcode area of the tape, and ATN data indicative of start and end positions of each program as program start information and program end information.

Since these pieces of information are recorded correspondingly with each program recorded on the tape 2, the user can know the contents of data recorded on the tape 2 without causing the tape 2 to be transported, by just reading out the program information from the memory 3.

Addresses "80h" to "FFh" serving as an option area 1 are provided for recording key information indicative of a program for which restoration (reproduction) is allowed to the user, and other information specifically provided by the maker of the software tape. In other words, password data which is required for cancelling a reproduction protection (i.e., the unrestorable state) provided by the above-mentioned program information is recorded in the option area 1. This means that any program for which no key information is recorded in the option area 1 is not allowed to be restored (reproduced).

In the case of the example shown in FIG. 5, program information is recorded in respect of all the programs A, B and C. However, while key information in respect of the programs A and B is recorded, key information in respect of the program C is not recorded. In this case, therefore, the program C is not allowed to be restored (reproduced).

FIG. 6 is a table showing headers of information units (hereinafter referred to as packs) to be used in this embodiment for packaging in recording the above-mentioned program information, key information, etc., in the memory 3. Referring to FIG. 6, the contents of each pack are indicated by data of 8 bits obtained by combining a header of upper four bits and a header of lower four bits. In the case of this embodiment, as shown in FIG. 6, the headers are assigned, for example, respectively to the program information, key information, program start information and program end information. Other headers are arranged to indicate information of varied kinds.

In the case of this embodiment, with regard to a header of each pack, the header of the program information is thus indicated as "10h", the header of the program start information as "11h", the header of the program end information as "12h" and the program key information as "20h".

Therefore, when a pack having the header "10h" is present in the subcode area and the option area 0, it indicates that a program indicated by the pack is unrestorable.

FIGS. 7(a) and 7(b) show the structure and the contents of these pack data. FIG. 7(a) shows the structure of the program pack and FIG. 7(b) shows that of the program key pack. The contents of the pack shown in FIG. 7(a) are the same as the contents of the pack shown in FIG. 7(b), with the exception of their headers. Specifically, after one byte of the header, the ID data showing the maker of the software tape is recorded in one byte. After the ID data, passwords for cancellation of the reproduction protection provided by the program information are recorded in three bytes.

Therefore, even where there is a program pack for every one of programs, if a key pack for the program is recorded in the memory 3, it is possible to find whether or not a reproduction protection for the program can be canceled, by comparing contents PC1 to PC4 of the program pack with those of the key pack.

Operation of the VTR shown in FIG. 1 will be next described below with reference to FIG. 3 to FIGS. 7(a) and 7(b).

In the case of this embodiment, if a pack data included in the reproduced subcode data has the above-mentioned program header, data of a program indicated by the pack data is unrestorable (not reproducible). In order to cancel the unrestorable state of the program, the user is required to input passwords.

Therefore, in the case of this embodiment, the above-mentioned program information is recorded beforehand in the subcode area for a program requiring the reproduction protection. Meanwhile, the key information on each program for which the reproduction protection is to be canceled is recorded in the memory 3. At the time of reproduction, the key information is read out so as to enable the reproduction protection to be canceled.

Referring to FIG. 1, when the VTR is loaded with the tape cassette 1, the VTR operates as follows. The memory data processing circuit 9 first reads out data recorded in the memory 3 and writes the read-out data into the memory 10. After that, the individual contents of the data written into the memory 10 are serially read by the memory data processing circuit 9 and are discriminated one by one.

Through this process, the memory data processing circuit 9 serially extracts, from the data read out from the memory 10, data of each program pack recorded in the option area 0 and data of each program key pack recorded in the option area 1 of the memory 3 and sends them to the comparison circuit 11. The comparison circuit 11 compares the contents of the program pack extracted with the contents of the program key pack extracted. Only a program (or programs) for which the contents of the program pack and those of the program key pack coincide with each other, i.e., a program for which passwords are inputted, is decided to be a restorable (reproducible) program. Then, data of the program pack, the program start pack and the program end pack of this specific program are supplied to the system control circuit 12.

The system control circuit 12 then controls the display 14 on the basis of each data outputted from the memory data processing circuit 9 and causes the display 14 to display table-of-contents information of programs which can be monitored by the user.

The user then selects a program desired for reproduction from among the table of contents shown on the display 14 and operates the operation switch 13.

In response to the operation on the switch 13, the system control circuit 12 instructs the mechanism control/servo circuit 16 to bring out the leader of the desired program according to the contents of the program start pack of the program and the current tape position data (ATN data) reproduced from the tape 2 and obtained by the subcode processing circuit 8.

The mechanism control/servo circuit 16 in turn instructs the mechanism 15 to start a search action. The mechanism 15 then transports the tape 2 at a speed higher than a speed employed in recording. Data thus reproduced from the tape 2 is sent to the data detecting circuit 4 to be subjected to various processes including a digital data detecting process, a known error correction process, etc. As for subcode data included in the reproduced data, the subcode data is sent through the switch 5 to the subcode processing circuit 8.

The system control circuit 12 compares, on the basis of the reproduced data obtained by the searching reproduction, the ATN data outputted from the subcode processing circuit 8 with the ATN data which is included in the program start pack. The system control circuit 12 then controls the mechanism control/servo circuit 16, the data detecting circuit 4 and the signal processing circuit 6 in such a way as to stop the transportation of the tape 2 immediately before a start position of the desired program and to have a normal reproducing action automatically performed on the data recorded on the tape 2 from that start position.

FIGS. 8(a) to 8(d) show the contents of the software tape shown in FIG. 3 and three kinds of ranges of reproduction of the programs.

As shown in FIG. 8(a), there are recorded three kinds of programs A, B and C on the tape 2. The above-mentioned program pack is recorded in the subcode area and the memory 3 for each of these programs.

In a case where only the program A is to be made restorable among the three programs, as shown in FIG. 8(b), the key information on the program A is recorded in the memory 3, and a display is provided to show that the program A alone can be monitored.

In the case of FIG. 8(c), on the other hand, the programs A and B are made restorable while the program C is alone made unrestorable.

FIG. 8(d) shows a case where all the programs A, B and C are made restorable. In this case, the key information on every one of the programs A, B and C is recorded in the memory 3 along with the program information, and a display is provided to show that all of the programs A, B and C can be monitored.

The conventional software tape arrangement has necessitated use of three tape cassettes respectively for the three programs A, B and C. On the other hand, the arrangement of this embodiment permits use of only one tape cassette for all the programs by just writing into the memory 3 the program key pack for any of the programs desired by the user, for example, at a rental shop or store.

For writing (recording) the program key pack into the memory 3, the rental shop is provided beforehand with a list showing the data of program key packs for programs, for example, and the data of a program key pack for a program desired by the user is inputted by means of the operation switch 13 as requested by the user. Specifically, the memory data processing circuit 9 is caused to form and write the key pack data into the memory 3 by inputting ID data and passwords for the desired program.

The details of this operation are as follows. When the VTR is loaded with the cassette 1, the memory data processing circuit 9 reads out data stored in the memory 3 and stores the read-out data in the memory 10.

After that, when the ID data and the passwords for the desired program are inputted from the operation switch 13 as mentioned above, the system control circuit 12 controls the memory data processing circuit 9 on the basis of the input data. The memory data processing circuit 9 then forms key pack data for recording in the memory 3 and writes the key pack data at a predetermined address of the memory 10.

With the key pack data having been thus inputted, when the user gives an instruction to eject the tape cassette 1 by operating the switch 13, the system control circuit 12 controls and causes the memory data processing circuit 9 to read out data from the memory 10 and to write the data into the memory 3. Upon completion of writing the data into the memory 3, the system control circuit 12 controls and causes the mechanism control/servo circuit 16 to eject the tape cassette 1.

As described above, according to the arrangement of the first embodiment, program data for rendering programs on the tape unrestorable is recorded on the tape 2 and in the memory 3, and program key data for cancelling the unrestorable state of the programs is recorded in the memory 3. At the time of reproduction, any of these programs can be selectively restored (reproduced) by reading out these data from the memory 3 and by comparing these data with each other.

Further, the first embodiment is arranged to display a list of programs which can be monitored, as a table of contents, without including in the list any program which cannot be monitored. This display arrangement enables the user to readily know which of the programs on the tape can be monitored.

The operation described above is performed by the VTR, in selecting a program or programs for reproduction, by automatically checking data for restorable programs when the VTR is loaded with the tape cassette 1.

Further, while this invention is applied to a digital VTR in the case of the embodiment described above, this invention is not limited to digital VTRs. Advantageous effects similar to the effects mentioned above can be attained by applying this invention to any apparatuses that are arranged to reproduce data from a device integrally provided with a plurality of kinds of recording media.

As apparent from the foregoing description, the embodiment is arranged to be capable of detecting an unrestorable state of data from a recording device integrally provided with a plurality of kinds of recording media. In a case where there are data of a plurality of programs some of which are in an unrestorable state while the others are in a restorable state, for example, the embodiment is capable of making a discrimination between these states.

Further, since the embodiment is arranged to use data of a predetermined storage (recording) medium in cancelling an unrestorable state of data of another storage (recording) medium, it is possible to control and decide whether or not the data of another storage medium is to be rendered restorable (reproducible) by using the data recorded in the predetermined storage medium.

Further, it is possible to change a restorable program from one program to any other program as desired, by changing data of a program key pack to be written into the memory 10.

In the case of the embodiment described above, the program pack data and the key pack data are stored beforehand in the memory 3. At the time of reproduction, a reproduction protection is canceled by reading out these data from the memory 3.

However, this invention is not limited to this arrangement, which may be modified as follows. The program pack is not written into the memory 3. Where data of the program pack is included in the subcode reproduced from the tape 2, the data of the program pack is compared with the key pack data read out from the memory 3, and a reproducing (restoring) operation for data of the tape 2 is controlled according to the result of such a comparison.

Figure 10:
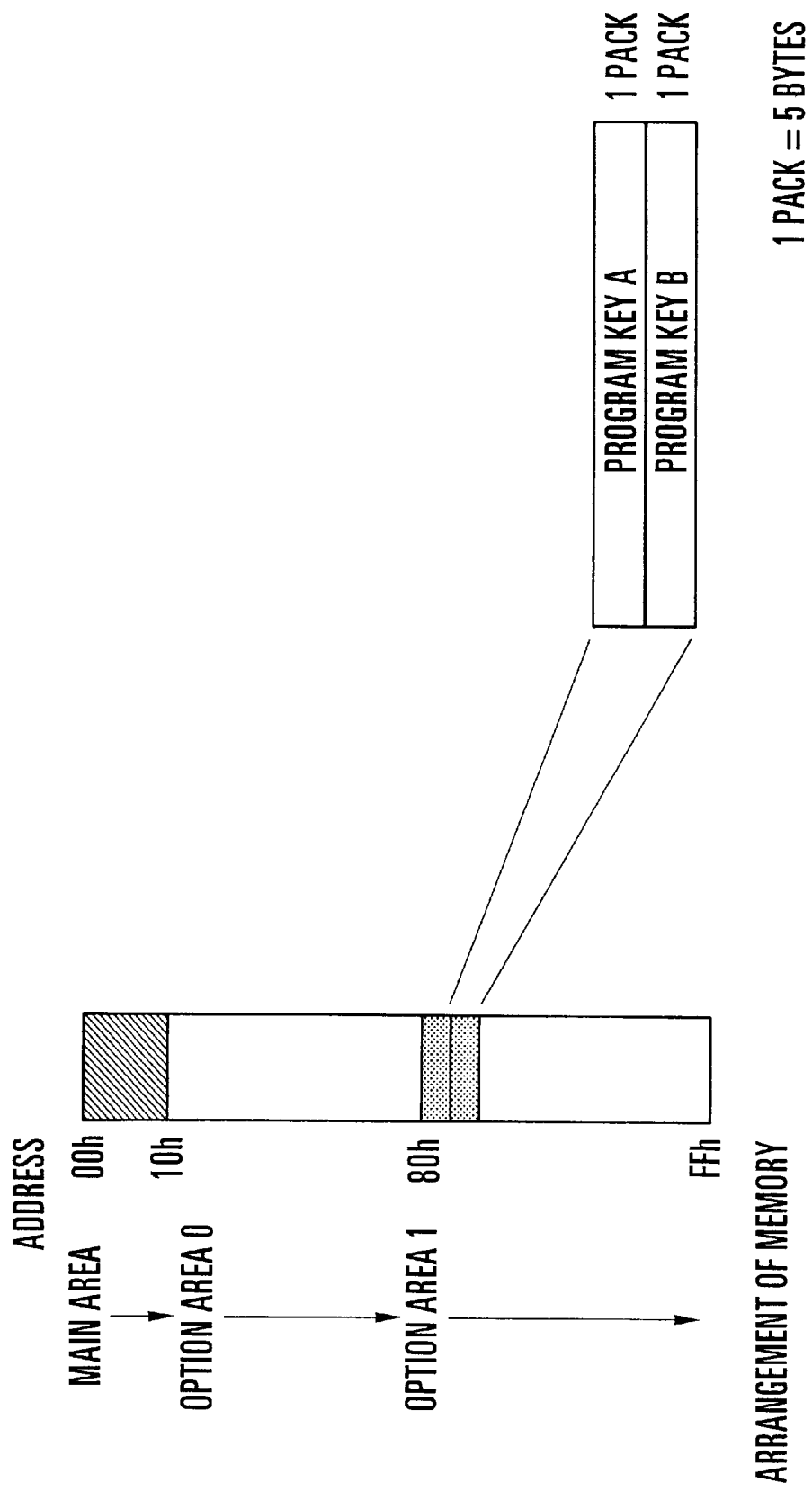
FIG. 10 is a diagram for explaining data stored in a memory of the tape cassette in the digital VTR shown in FIG. 9.
Figure 11:
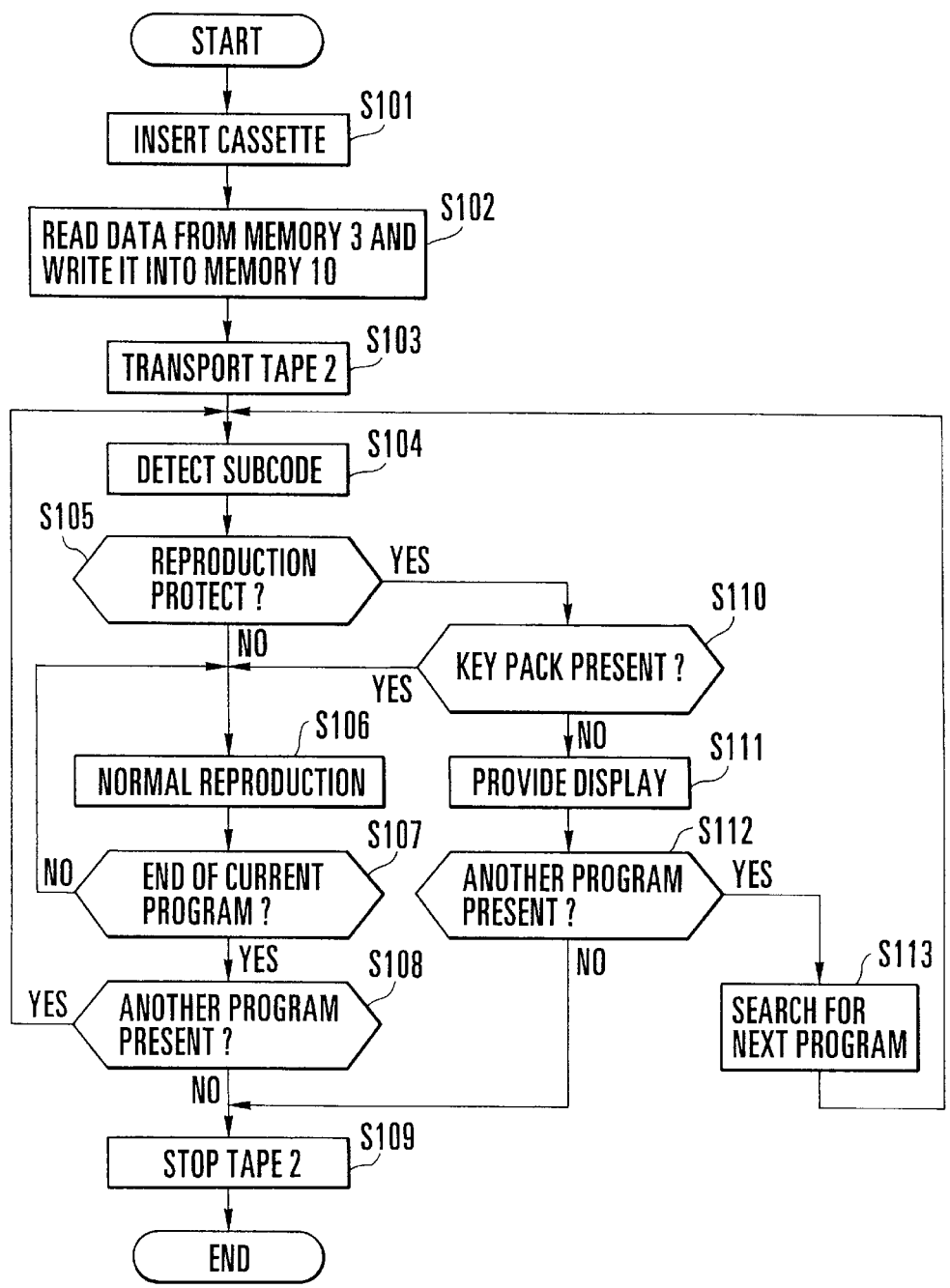
FIG. 11 is a flow chart for explaining an operation of the digital VTR shown in FIG. 9.

The details of such modification will be described in the following with reference to FIGS. 9 to 11.

Figure 9:
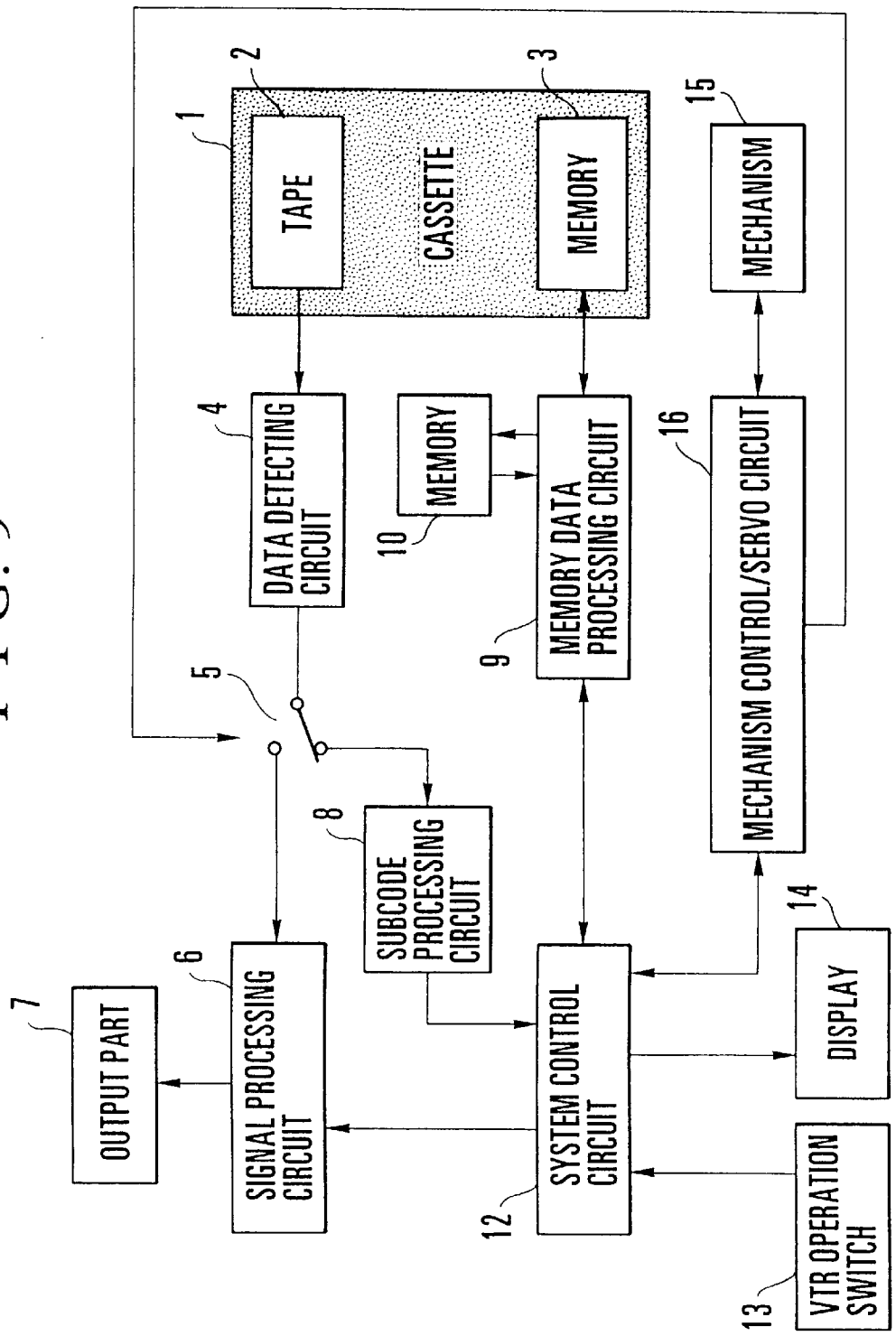
FIG. 9 is a block diagram showing the arrangement of a digital VTR according to another embodiment of this invention.

FIG. 9 shows the arrangement of a digital VTR according to a second embodiment of this invention. In FIG. 9, all blocks and parts having the same functions as those of FIG. 1 are indicated by the same reference numerals as those of FIG. 1. With the exception of the fact that no program pack is written in the memory 3 as shown in FIG. 10, the second embodiment is arranged to have the tape format, the structure of the tape cassette, etc., arranged in the same manner as in the case of the first embodiment described with reference to FIG. 2 to FIGS. 8(a) to 8(d).

Further, while the comparison circuit 11 is discretely arranged in the VTR (the first embodiment) of FIG. 1, the second embodiment has the system control circuit 12 arranged to perform the function of the comparison circuit 11.

Actions of the VTR of FIG. 9 (the second embodiment) will be next described with reference to FIG. 11, which is a flow chart showing mainly the actions of the system control circuit 12.

At a step S101, the cassette 1 is inserted into the VTR. At a step S102, the system control circuit 12 controls and causes the memory data processing circuit 9 to read out data stored in the memory 3 and to write the read-out data into the memory 10. The flow of operation then waits for an operation on the switch 13 by the user. When the switch 13 is operated by the user to give an instruction for reproduction, the flow proceeds to a step S103. At the step S103, the system control circuit 12 controls and causes the mechanism control/servo circuit 16 and the data detecting circuit 4 to start transporting the tape 2. At a step S104, the subcode processing circuit 8 is caused to detect subcodes included in data reproduced.

At a step S105, a check is made to find if the above-mentioned program pack data is included in the subcodes. If the program pack data is not included, thus showing no reproduction protection, the flow proceeds to a step S106 to carry on a normal process of reproducing video and audio data from the tape 2.

At a step S107, ID data included in the subcodes is continuously monitored while the normal reproduction is in process, so as to find if a program being currently reproduced has come to an end. If so, the flow proceeds to a step S108. At the step S108, a check is made on the basis of data read out from the memory 3 to find if data of any other program is also recorded on the tape 2. If not, or if other programs have already been reproduced, the flow proceeds to a step S109 to stop the tape 2 from being transported. If there is a record of another program on the tape 2, the flow returns to the step S104.

If the program pack data is found to be included in the subcodes at the step S105, the flow of operation proceeds to a step S110. At the step S110, a check is made to find if any key pack data is included in the data read out from the memory 3 and, if so, a further check is made to find if the key pack data included pertains to the current program. The step S110 is thus arranged to function in the same manner as the comparison circuit 11 of the first embodiment described in the foregoing.

If a pertinent key pack is found there, the reproduction protection for the program is canceled, and the flow shifts to the process of a normal reproducing operation.

If no key pack data is found, the program is considered to be inhibited from being restored (reproduced). The flow then proceeds to a step S111 to cause the display 14 to provide a display showing the inhibited state. At the next step S112, a check is made in the same manner as the step S108 to find if there is any other program. If there is no program to be reproduced, the tape transportation is brought to a stop at the step S109. If there is another program recorded on the tape 2, the flow proceeds to a step S113. At the step S113, a searching action is performed to transport the tape 2 at a high speed to the foremost track of an area where the data of the next program is recorded. The flow then returns to the step S104.

Further, the searching action mentioned above is carried out by comparing the ATN data reproduced from the tape 2 with the leading track number of each program read out from the memory 3.

The second embodiment is thus arranged to be also capable of selectively reproducing a desired program by recording in the memory 3 beforehand the key pack data for cancelling the reproduction protection applied to each of programs recorded on the tape 2.

While the first and second embodiments described above are arranged to apply the reproduction protection by recording program pack data in the subcode data, this invention is not limited to such an arrangement. That arrangement may be changed, for example, to record audio and video data after a predetermined scramble process is applied to the audio and video data and to write key data into the memory 3 for cancelling the scrambled state as desired.

I claim:

1. An apparatus for reproducing data from a memory device integrally provided with a first recording medium and a second recording medium of respective different kinds, said apparatus comprising:

first reproducing means for reproducing data from the first recording medium;

second reproducing means for reproducing image data from the second recording medium;

restoring means for restoring an original image from the image data reproduced by said second reproducing means; and control means for, on the basis of the data reproduced by said first reproducing means, changing image data reproduced by said second reproducing means and being unrestorable by said restoring means into a restorable state.

2. An apparatus according to claim 1, wherein the data recorded in the second recording medium includes subdata related to the image data, and wherein said control means inhibits a restoring process of the reproduced image data from being performed by said restoring means, according to data included in the subdata and indicative of inhibition of restoration of the image data.

3. An apparatus according to claim 2, wherein said control means cancels the inhibition of restoration of the image data according to cancellation data reproduced from the first recording medium and indicative of cancellation of the inhibition of restoration of the image data recorded in the second recording medium.

4. An apparatus according to claim 2, wherein the image data and the subdata are recorded in each of a number of tracks formed on the second recording medium, and wherein the data included in the subdata and indicative of the inhibition of restoration of the image data is recorded at intervals of a predetermined number of the tracks.

5. An apparatus according to claim 1, wherein the image data recorded in the second recording medium has a plurality of programs, and wherein said control means selectively cancels inhibition of restoration of data of the plurality of programs.

6. An apparatus according to claim 5, wherein the data recorded in the second recording medium further includes first data for inhibiting restoration of image data of each of the plurality of programs, and the data recorded in the first recording medium includes second data for selectively cancelling the inhibition of restoration of image data of the plurality of programs.

7. An apparatus according to claim 6, wherein said control means selectively cancels the inhibition of restoration of image data of the plurality of programs on the basis of the second data.

8. An apparatus according to claim 1, wherein the image data is coded image data, and wherein said restoring means includes decoding means for decoding the reproduced image data.

9. An apparatus for recording data on a memory device integrally provided with a first recording medium and a second recording medium of respective different kinds, said apparatus comprising:

generating means for generating cancelling data for cancelling inhibition of restoration of image data recorded in the second recording medium; and recording means for recording in the first recording medium the cancelling data generated by said generating means.

10. An apparatus according to claim 9, wherein the image data recorded in the second recording medium has a plurality of programs.

11. An apparatus according to claim 10, wherein said generating means generates cancelling data for selectively cancelling inhibition of restoration of image data of the plurality of programs.

12. An apparatus according to claim 9, further comprising manually operable means, and wherein said generating means generates the cancelling data in response to an operation of said manually operable means.

13. An apparatus for reproducing data from a memory device integrally provided with a first recording medium and a second recording medium of respective different kinds, said apparatus comprising:

first reproducing means for reproducing data from the first recording medium;

second reproducing means for reproducing data related to predetermined information from the second recording medium;

restoring means for restoring the predetermined information on the basis of the data reproduced by said second reproducing means; and control means for, on the basis of the data reproduced by said first reproducing means, changing data reproduced by said second reproducing means and being unrestorable by said restoring means into a restorable state.

14. A reproducing apparatus for reproducing data from a memory device integrally provided with a first recording medium and a second recording medium of respective different kinds, characterized in that a reproduction protect applied to image data of each of a plurality of programs recorded in the second recording medium is automatically cancelled according to data reproduced from the first recording medium.

15. An apparatus for reproducing data from a memory device integrally provided with a first recording medium and a second recording medium of respective different kinds, said apparatus comprising:

first reproducing means for reproducing control data from said first recording medium;

second reproducing means for reproducing image data from said second recording medium;

restoring means for restoring an original image from the image data reproduced by said second reproducing means, the image data being recorded on said second recording medium in an unrestorable state for an image to be restored from the image data by said restoring means; and control means for, on the basis of the control data reproduced by said first reproducing means, controlling said restoring means to enable restoring of the image from the image data reproduced by said second reproducing means.

16. An apparatus according to claim 15, wherein said second reproducing means reproduces subdata indicative of inhibition of restoration of the image from the image data by said restoring means.

17. An apparatus according to claim 15, wherein the image data recorded in said second recording medium has a plurality of programs, and wherein said control means controls said restoring means to selectively enable restoring of an image from the image data of the plurality of programs.

18. An apparatus according to claim 17, wherein said second reproducing means has subdata indicative of inhibition of restoration of an image from the image data of each of the plurality of programs by said restoring means.

19. An apparatus according to claim 15, wherein the image data is processed with a scramble process to be thereafter recorded on said second recording medium.

20. A reproducing apparatus, comprising:

reproducing means for reproducing data from a storage device, the storage device having a first memory area for storing information data and inhibition data indicative of inhibition of restoration of the information data, and a second memory area for storing control data for canceling the inhibition of restoration of the information data stored in the first memory area;

restoring means for restoring an original information from the information data reproduced by said reproducing means; and control means for controlling said restoring means so as to enable restoring of the information from the information data reproduced by said reproducing means by using the inhibition data and the control data.

21. An apparatus according to claim 20, wherein the information data has a plurality of programs, the inhibition data being provided for each of the plurality of programs.

22. An apparatus according to claim 20, wherein the control data includes password data, said control means controlling said restoring means by comparing the inhibition data and the password data.

23. An apparatus according to claim 20, wherein said reproducing means comprises moving means for moving the storing device, said control means controls a moving operation of said moving means according to the inhibition data and the control data.

24. An apparatus according to claim 20, wherein the information data includes image data.

25. A recording apparatus for recording data in a storage device which has a first memory area for storing information data having a plurality of programs and inhibition data for inhibiting restoration of information data stored in the first memory area, said apparatus comprising:

determining means for determining a program from the plurality of programs of the information data;

generating means for generating control data for canceling inhibition of restoration of the information data stored in the first memory area according to the determined result; and recording means for recording the control data generated by said generating means in a second memory area of the storage device.

26. An apparatus according to claim 25, wherein said determining means comprises manually operable member to determine the program from the plurality of programs.

27. A reproducing method for reproducing data from a storage device having a first memory area for storing information data and inhibition data for inhibiting restoration of information data stored in the first memory area and a second memory area for storing control data for canceling inhibition of restoration of the information data stored in the first memory area, characterized in that a reproduction protect applied to the information data of each of a plurality of programs stored in the first memory area is automatically canceled by comparing the inhibition data reproduced from the first memory area and the control data reproduced from the second memory area.

* * * * *